Moule & Girdlestone.
Earth Closet.

No. 91,474. Patented Jun. 15, 1869.

Witnesses:
Gustave Dieterich
Oscar Hinchman

Inventors:
Henry Moule
H. J. Girdlestone

United States Patent Office.

HENRY MOULE, OF FORDINGTON, AND HENRY JOHN GIRDLESTONE, OF LONDON, ENGLAND.

Letters Patent No. 91,474, dated June 15, 1869.

---

IMPROVEMENT IN DEODORIZING-APPARATUS FOR WATER-CLOSETS.

---

The Schedule referred to in these Letters Patent and making part of the same.

---

*To all whom it may concern:*

Be it known that we, HENRY MOULE, of Fordington, in the county of Dorset, clerk in holy orders, and HENRY JOHN GIRDLESTONE, of Norfolk street, Strand, London, in the county of Middlesex, England, civil engineer, directors of the Moule Patent Earth-Closet Company, limited, have invented certain new and useful "Improvements in Earth-Closets and Commodes;" and we do hereby declare that the following is a full and exact description thereof, reference being had to the accompanying drawings, and to the letters of reference marked thereon.

Our invention relates to improvements in apparatus to be used in closets and commodes, in which dry and powdered earths, (consisting of clay in a dry, unburned state, or loam,) lime, peat, and other dry vegetable matters, in powder, but more especially dry earths, are employed for deodorizing the fresh excrementitious matters, by covering or dusting them over with such powdered and dry earths.

Figure 1:
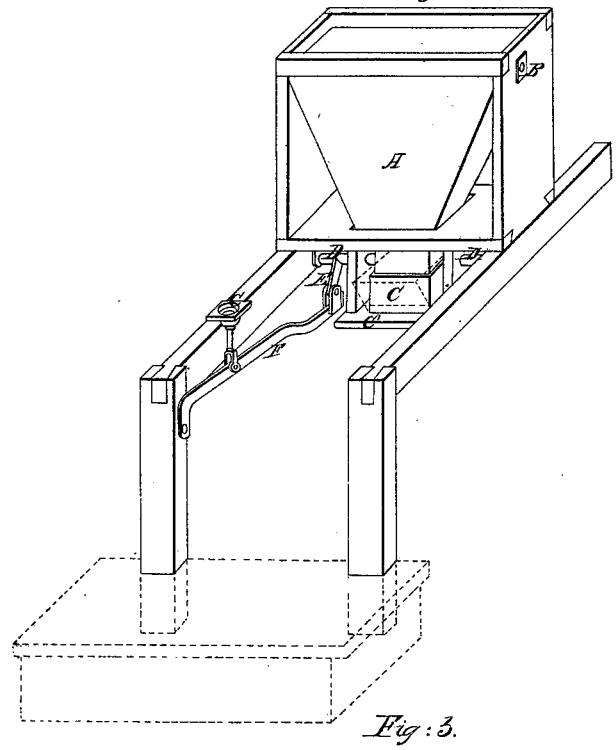

Figure 1 of the drawings shows a perspective view, and

Figure 2:
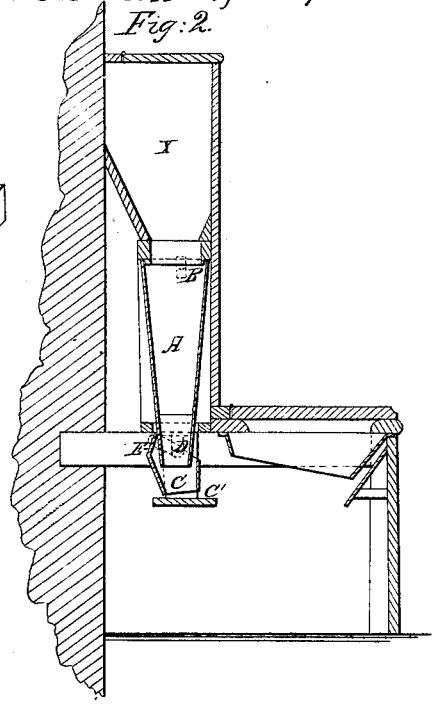

Figure 2, a transverse section of an earth-closet apparatus, having a pull-lever action.

The apparatus consists of a reservoir or hopper, A, filled with a dry and sifted matter.

This hopper A is hung on pivots B B, at the upper part, disposed so that it may swing forward by its own gravity.

The lower end of the hopper opens in what we term a "chucker," C, for discharging the earth in sufficient quantity into a suitable receptacle on the excrementitious matters below.

This "chucker" C, which is always charged with earth, is mounted on an axis, D, carried in bearings at either side, in the vertical position shown in fig. 1, and its open bottom supported immediately above a fixed plate, C'.

The "chucker"-axis D is connected by an arm, E, fixed thereon, to a bent lever, F, jointed at one end to the uprights of the closet-casing, said lever F being connected to a pull-handle, G.

The parts being thus arranged, and enclosed in a suitable casing provided with a seat, the person using the closet, on rising from the seat, raises the pull-handle G, which, being connected to the lever F, and so, with the axis of the "chucker" C, brings the latter to a horizontal position, as shown, dotted, for discharging the earthy matters contained on to the excreta in the receptacle below.

The chucker C, in rising to a horizontal position, strikes against the bottom part of the hopper A, and so oscillates said hopper on its axis B, in a backward direction, and when the chucker reassumes the vertical position, on the pull-handle G being released, the hopper A falls forward, and again discharges a portion of the earth it contains into the chucker, as before.

Figure 3:
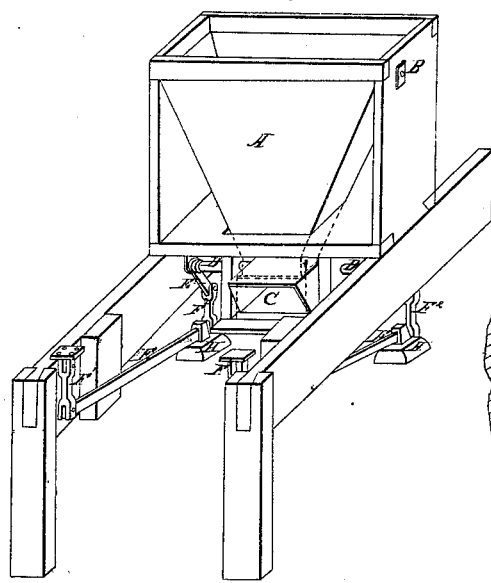

Figure 3 of the drawings shows a perspective view of the apparatus before described, in which the action of the chucker and hopper is produced by the aid of the seat, instead of by a pull-handle, as before.

Figure 4:
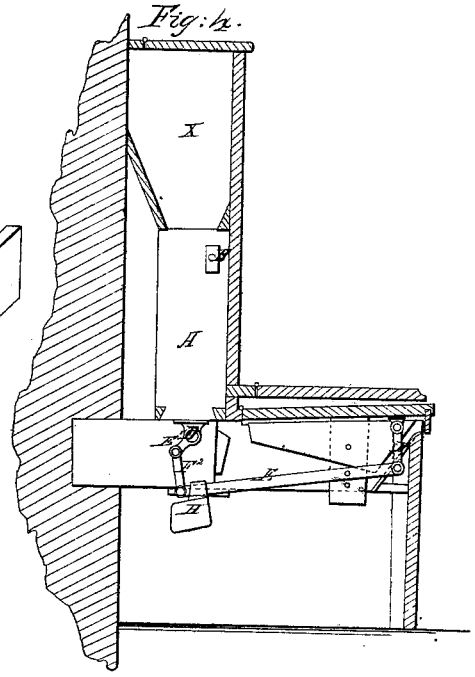

Figure 4 shows a transverse section of this apparatus.

In this case, two oscillating levers, E, are employed, mounted, one at either side, which are connected to those at one end by means of links F¹ F¹, and at the other end, by means of additional links F² F², to the arms E E of the chucker-axis D, before referred to.

In this arrangement, the chucker C assumes a horizontal position when not in use.

The action is as follows:

When the closet is used, the person, by the act of seating himself, depresses the forward ends of levers F by means of links F¹ F¹, thereby raising the links F² F² of chucker-axis, and bringing the chucker to a vertical position, as shown in dotted lines.

This motion permits of the oscillating hopper B coming forward and discharging a portion of its contents into the chucker C, in readiness for use.

On the person rising from the seat, the counter-balance-weights H H bring the levers E to their original position, at same time that the chucker C, in resuming its original position, discharges the earth contained on to the excreta in the receptacle, and moves back the hopper A, as before.

X, figs. 2 and 4, is a reservoir, placed above the hopper A of the closet, and serving to contain the earthy matters, which are introduced, either by a lid at top, as seen, or through an opening at back.

These reservoirs X are not employed in the case of commodes.

What we claim as our invention, and desire to secure by Letters Patent of the United States of America, is—

1. The oscillating hopper A, the chucker C, upon the oscillating shaft D, the shelf C', pivoted lever F, and handle G, combined to operate within the case, substantially as described, for the purpose specified.

2. The oscillating hopper A, the chucker C, upon the oscillating shaft E, and the weighted levers, in combination with each other, and the hinged seat, substantially as described, for the purpose specified.

The above specification of our invention signed by us, this 4th day of March, 1869.

HENRY MOULE.
H. J. GIRDLESTONE.

Witnesses:
J. DAISH, 53 *Chancery Lane*,
M. WYNN, 24 *Royal Exchange*.